US006789199B1

(12) United States Patent
Wilhelm, Jr.

(10) Patent No.: US 6,789,199 B1
(45) Date of Patent: Sep. 7, 2004

(54) TAMPER RESISTANCE WITH PSEUDO-RANDOM BINARY SEQUENCE PROGRAM INTERLOCKS

(75) Inventor: George W. Wilhelm, Jr., Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,345

(22) Filed: Feb. 8, 2000

(51) Int. Cl.[7] .................. G06F 11/30; G06F 12/14; G06F 17/60; H04L 9/00; H04L 9/32; H04K 1/00

(52) U.S. Cl. .................. 713/200; 713/190; 713/194; 713/164; 713/166; 713/167; 705/52; 705/57

(58) Field of Search .................. 713/190, 200, 713/191, 192, 193, 194, 164, 166, 167; 717/133; 705/57, 52

(56) References Cited

U.S. PATENT DOCUMENTS

| | | | |
|---|---|---|---|
| 4,573,119 A | | 2/1986 | Westheimer et al. |
| 4,605,922 A | | 8/1986 | Blattman et al. |
| 4,644,493 A | * | 2/1987 | Chandra et al. ............ 705/56 |
| 4,932,053 A | | 6/1990 | Fruhauf et al. |
| 5,175,847 A | | 12/1992 | Mellott |
| 5,337,357 A | | 8/1994 | Chou et al. |
| 5,748,739 A | * | 5/1998 | Press ..................... 713/164 |
| 5,935,246 A | | 8/1999 | Benson |
| 5,970,145 A | * | 10/1999 | McManis ................. 713/187 |
| 6,463,538 B1 | * | 10/2002 | Elteto .................... 713/190 |

FOREIGN PATENT DOCUMENTS

| | | |
|---|---|---|
| GB | 2019060 A | 3/1979 |
| GB | 2 019 060 | 10/1979 |
| GB | 2243701 A | 3/1991 |
| GB | 2 243 701 | 11/1991 |

OTHER PUBLICATIONS

H.S. Stone & J. Turek, Scheme for Controlling Concurrent Algorithms that Update Linked Data Structures.
IBM Technical Disclosure Bulletin, vol.36/No. 10, Oct. 1993; pp. 437–440.

* cited by examiner

*Primary Examiner*—Gilberto Barrón
*Assistant Examiner*—Benjamin E. Lanier
(74) *Attorney, Agent, or Firm*—Whitham, Curtis & Christofferson, P.C.; William H. Steinberg (57) ABSTRACT

Tamper resistance is provided to avoid observation of the behavior of portions of software by calling a function exclusively available in one differentiated section of a processor and its peripherals and drivers from another differentiated section. A pseudo-random binary sequence generator is associated with each such differentiated section and incremented incident to the calling and performance of the function, respectively. The pseudo-random binary sequence values are compared prior to allowing or preventing further execution of the software. The comparison can be performed at any privilege level and a variation of the invention provides additional security by utilizing an additional privileged function to perform the comparison. An enhancement of the invention corrupts data or program files using a PRBS value at one privilege level and performs the inverse function to restore the data or program files at another privilege level with its own PRBS value.

18 Claims, 5 Drawing Sheets

TAMPER RESISTANCE WITH PSEUDO-RANDOM BINARY SEQUENCE PROGRAM INTERLOCKS

BACKGROUND OF THE INVENTION

1. Field of the Invention

The present invention generally relates to the provision of security for computer software applications and, more particularly, to arrangements for preventing observation of the behavior of applications programs by unauthorized personnel.

2. Description of the Prior Art

The number and diversity of computer applications software has proliferated during the past few years. Hardware developments of computers has allowed the functionality of such applications programs to be greatly expanded and, consequently the amount of code that must be written and other development costs has increased greatly. During the same period of time, the awareness of software vendors of the value of such programs which may be lost by unauthorized duplication has grown. Accordingly, it is now common practice for software vendors to require registration of individual program copies or to sell site licenses for particular users and to include features in the program which prevent the running of the application or major portions thereof by persons other than those to whom the program copy is registered.

Registration of software is generally enforced by disabling large portions of the software unless access is authorized in accordance with the registration. In much the same manner, it is common practice to promote sales of software by providing the software to the user, possibly on-line, in a form which has reduced functionality similar to that of a demonstration copy which can be run sufficiently for a potential purchaser to determine whether or not to purchase it. The enablement of initially disabled functions is then performed remotely upon purchase, payment and registration. Distribution of software in such a convertible form also provides the benefit of avoiding the need to produce a separate version as a demonstration copy and the potential for corruption of one copy with another.

However, while such features have developed a level of sophistication and complexity and have achieved a good level of security, it is axiomatic that any such feature can be defeated by modification of the application program to bypass such features. The process by which functionality of protected software and access to protected functions can be restored is generally referred to as "hacking", which is also generally applied to the defeat of password protection, user identification or verification and the like. The process of modification of the program is often referred to as "patching". The quality of providing difficulty in modification of the program by hacking is referred to as "tamper resistance". Of course, "tamper resistance" is a desirable quality for many types of software, such as databases, as well as application programs.

Creation of tamper resistant software often involves the concept of privilege levels incorporated in the processor and so-called privileged instructions. Privileged instructions are generally required to allow access to restricted features of the processor architecture. For example, privileged instructions or functions may include the loading and unloading of protected dedicated debug registers in the processor, hooking of interrupt vectors and processing critical operating system (OS) memory areas as well as input/output (I/O) functions. These privileged functions are controlled (e.g. requested) by the application at a low privilege level but are actually performed by other structure or software at a higher privilege level during normal operation of the application program through more privileged operating system components. In particular, execution of I/O functions is restricted to the highest privilege level(s) of the OS and cannot be performed but only requested by applications operating or executing at lower privilege levels.

That is, to make application software more secure, consistent with software development requirements, it is often necessary to develop a privileged companion software module (usually in the form of a device driver) which works in tandem with the application and performs these privileged operations on behalf of the less privileged application. When the application has a need (or should have a need, as determined by the programmer) to verify system integrity or to determine if certain types of tampering have occurred, the application can make a call to the privileged module to perform these services. Unfortunately, such an organization and its relatively widespread use make the interface between the application and the privileged module a logical point of attack for attempting to defeat a security feature. For example, patching out the security related calls to the privileged module would, in many cases defeat the tamper resistance and integrity check functions they are intended to perform.

While no form of tamper resistance is completely secure, it is generally recognized that the greater the level of complexity that can be provided in such measures (e.g. by inclusion of more techniques, traps and interdependencies) within the application and the corresponding privileged module, the lower the likelihood of success in defeating them within a given amount of time and effort to compromise application or data integrity or to obtain access to secrets contained therein. Unfortunately, such complexity may also compromise the reliability and/or stability of the software application (or, for example, the robustness of a data base and/or error recovery systems) as well as the execution speed and efficiency of the software, itself. Therefore, there is a heretofore unavoidable trade-off between efficiency of application execution and security of the application, itself, and its data.

SUMMARY OF THE INVENTION

It is therefore an object of the present invention to provide a technique of increasing security for software by detection of tampering and termination of execution and/or corruption of files when tampering is detected.

It is another object of the present invention to provide effective security for software without significant compromise of execution efficiency of the software.

It is a further object of the invention to prevent the observation of software behavior by unauthorized persons.

It is yet another object of the invention to prevent unauthorized enablement or observation of disabled or protected portions of software.

In order to accomplish these and other objects of the invention, a method is provided for providing tamper resistance in software running on a processor having a plurality of differentiated sections, a first differentiated section being capable of performing a function not available on a second differentiated section, and software containing commands for performing the method are provided comprising the steps of incrementing a first pseudo-random binary sequence associated with the second differentiated section, calling the function in the first differentiated section from the second differentiated section, incrementing a second pseudo-random binary sequence generator associated with the first differentiated section, performing the function (which may include a comparison of pseudo-random sequence values or may or may not include one or more operations in addition to the incrementing of a pseudo-random binary sequence generator), comparing pseudo-random binary sequence values in said first and second pseudo-random binary sequence generators, and controlling execution of said software in accordance with a result of the comparison.

In accordance with another aspect of the invention, a method for providing tamper resistance in software running on a processor having a plurality of differentiated sections, one differentiated section being capable of performing a function not available on a second differentiated section, and software containing commands for performing the method are provided comprising the steps of altering data using an algorithm and a pseudo-random binary sequence value in a first differentiated section, and altering data using an inverse algorithm and a pseudo-random binary sequence value at the first differentiated section, whereby data altered by said algorithm is restored when the pseudo-random binary sequence values of said differentiated section and said another differentiated section are the same.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
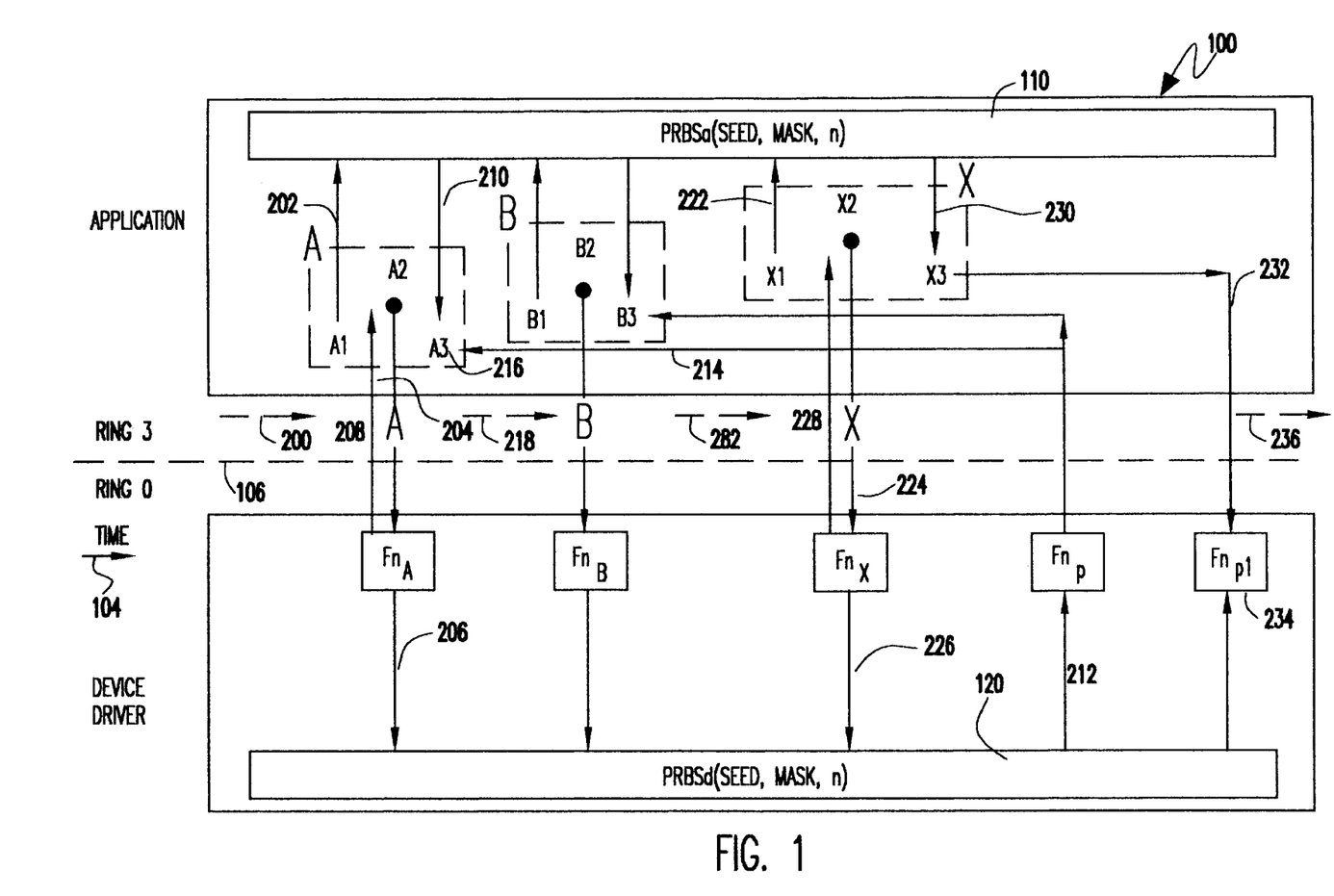
FIG. 1 is a high-level block diagram of a preferred embodiment of the invention and illustrating operation thereof, FIGS. 2A and 2B comprise a flow chart depicting the operation of the embodiment of the invention illustrated in FIG. 1.
Figure 2A:
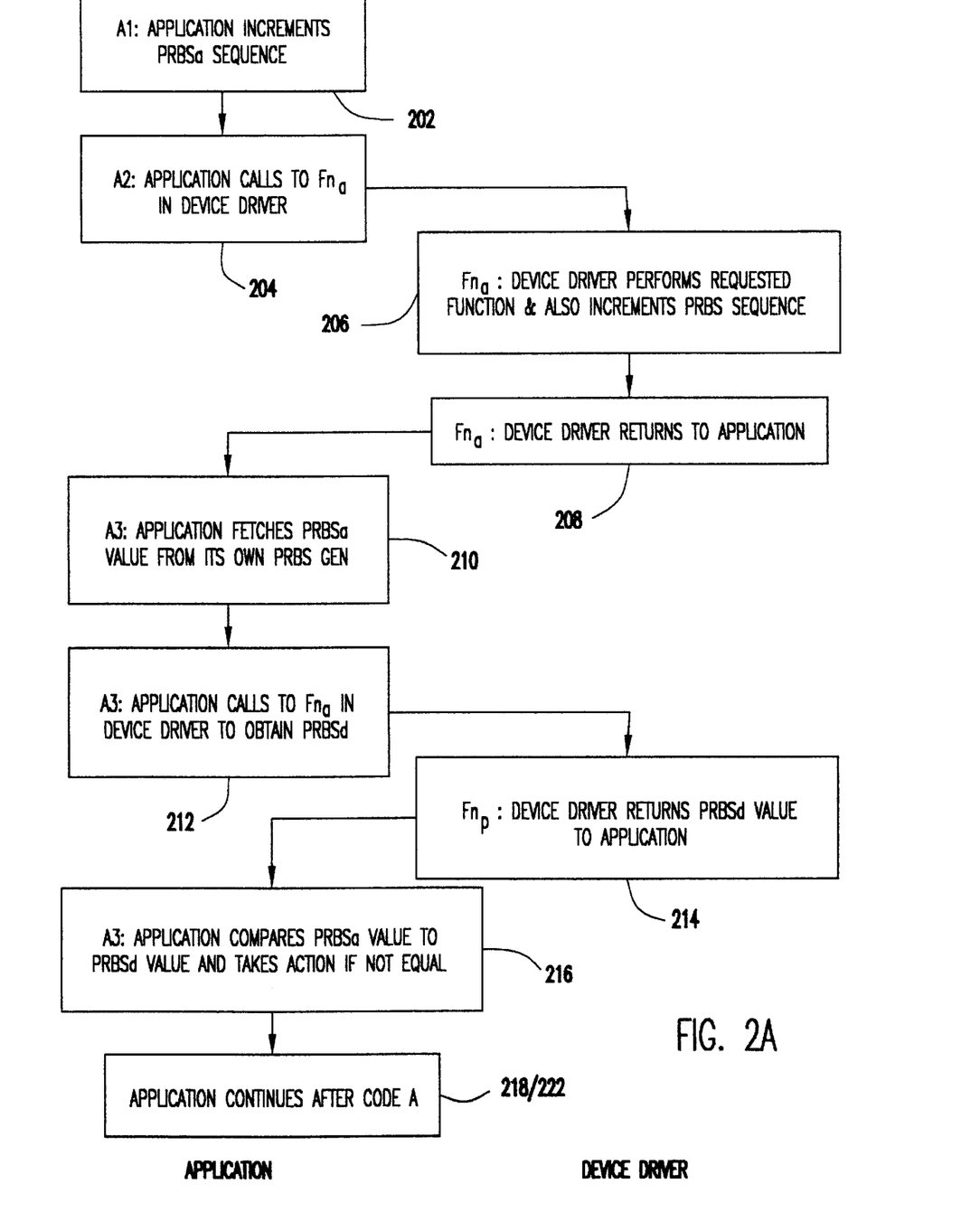
Figure 2B:
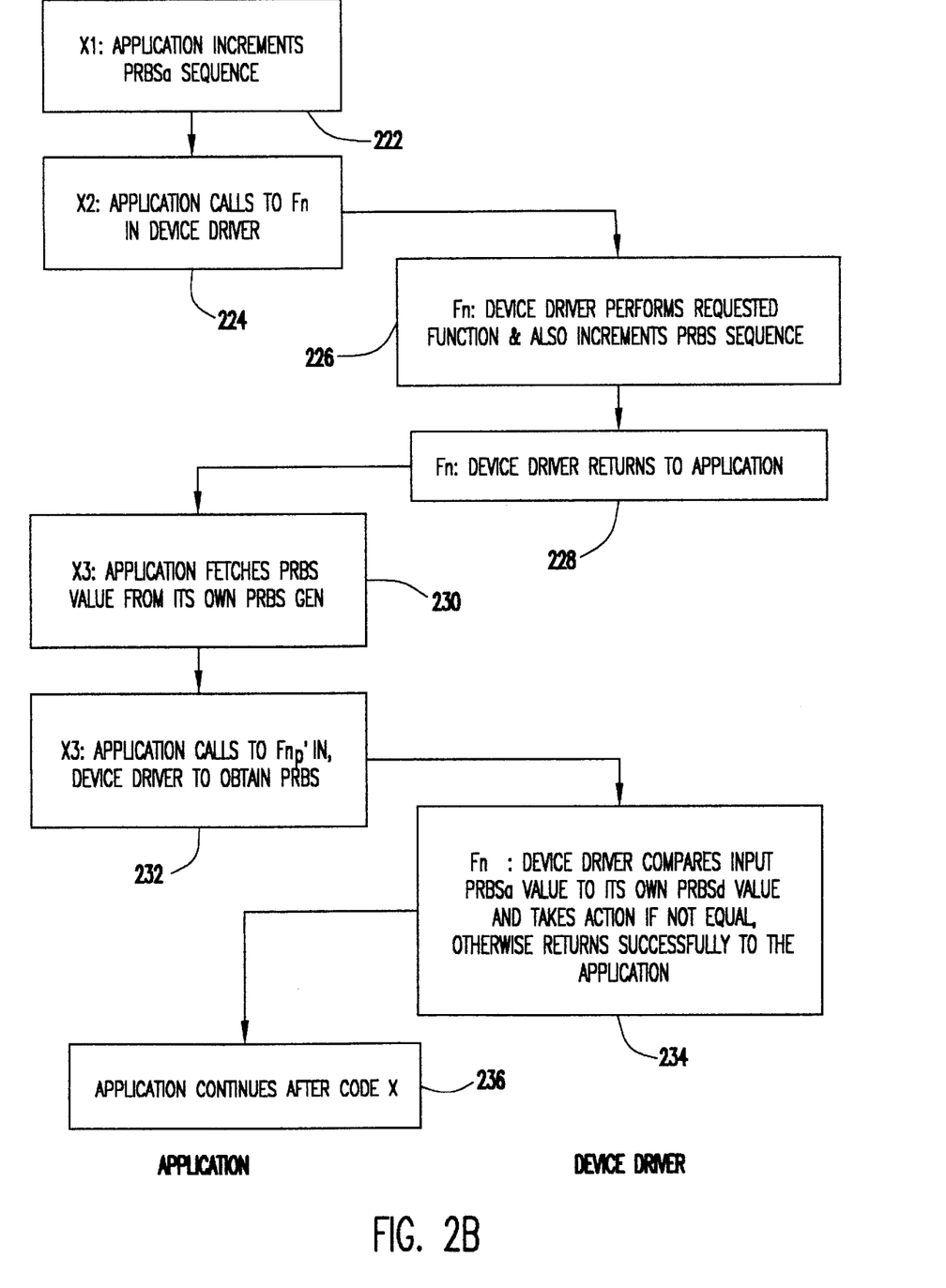

Referring now to the drawings, and more particularly to FIGS. 1, 2A and 2B, there is shown an embodiment of the invention 100 in high-level schematic block diagram form. It should be noted that an arbitrary time scale (from left to right) is provided in FIG. 1, as indicated by arrow 104, in which solid blocks denote functional elements which may be embodied in either hardware or software. Blocks depicted with dashed lines represent software sequences for which protection is desired. In FIGS. 2A and 2B, the sequence proceeds from top to bottom and the software on which each function illustrated is performed is segregated to the left or right in much the same manner that FIG. 1 is divided by dashed line 106 which divides privilege levels. Thus, FIGS. 1 and FIGS. 2A and 2B depict much the same subject matter with different emphasis and point of view. Corresponding reference numerals will be used where possible. (The same drawing conventions are adopted in FIGS. 3 and 4, respectively, as well.)

Pseudo-random binary sequence (PRBS) generators are well-known and have been used and implemented in many forms, as will be recognized by those skilled in the art. In general, PRBS generators are embodied as a logic array that may include a plurality of storage devices. One often used form of PRBS generator utilizes a serially connected string of flip-flops in the nature of a shift register. It has been shown for such shift registers of various lengths that feedback of the output of some stages to other stages as either the true or complement value and possibly combined logically with the output of other stages (more generally referred to as a mask), long strings of logic values can be produced that have statistical properties substantially identical to truly random values. Of course, such a hardware implementation can be, and often is, simulated in software in a manner well-understood in the art. (In fact, a software implementation is much preferred for practice of the invention, as will be discussed in greater detail below.

The repetition period of a PRBS generator may be made extremely long relative to the number of storage stages provided. The output of a PRBS generator may be taken serially from a single stage or in parallel in a byte of arbitrary length (up to the number of storage stages) in parallel from internal taps. While the PRBS will repeat after a number of binary digits that may be made arbitrarily long, the starting point of the sequence may be begun at any point by the particular values which are initially provided to the PRBS generator as, for example, the initial storage states of the storage devices therein. These initial states are collectively referred to as a seed value. Therefore, the number of unique sequences which can be derived from a PRBS generator is equal to the number of digits in the repetition sequence.

Further, each different logic array interconnection or mask in the PRBS generator (e.g. feedback and logical combination of outputs of respective stages) will provide a unique binary sequence. By the same token, however, the same binary sequence can only be derived from functionally identical PRBS generators having the same mask, number of storage stages and initialized with the same seed value. Therefore, PRBS sequences are difficult to duplicate without foreknowledge of these parameters.

The invention, in principle, uses two identical PRBS generators 110 and 120 (or PRBS generators having the same mask and number of stages, n) and initialized with the same seed value which are incremented upon the request and execution of a privileged call, respectively. One of these identical PRBS generators is provided at or made accessible to each of the privilege levels between which tamper resistance is to be provided in accordance with the principles of the invention. The PRBS from the PRBS generators are compared at either the more privileged or less privileged level (or other functions performed at both differing privilege levels based on the PRBS in each respective level) and interruption of execution and interception of results of the more privileged function are carried out whenever the respective PRBS signals are not identical. This basic mode of operation can be carried out very rapidly and does not significantly compromise execution efficiency of the software, even when repeated frequently, and can be readily enhanced as will be described in greater detail below, with reference to FIGS. 3 and 4.

Referring now to FIG. 1 and FIGS. 2A and 2B, It will be appreciated that two levels of privilege are shown; each having a respective PRBS generator 110 or 120. These levels of privilege are denominated as ring 3 (less privileged) and ring 0 (more privileged) consistent with Windows-Intel environment terminology. However, it should be understood that the invention is fully applicable to any environment in which different functions are executed at different privilege levels or otherwise restricted to execution by specific, segregated hardware, software or firmware. For example, a specific data path or register may be required for execution of a command.

That is, for successful practice of the invention to provide its intended purpose, it is only necessary for the processor or its peripherals or drivers therefor to have (or be configurable to have) differentiated operational sections capable of being associated with discrete, identical (or identically configured and initialized) PRBS generators and that one such differentiated section be capable of performing a function not available in the other differentiated section. Accordingly, the term "differentiated section" should be understood as comprehending all such possible arrangements meeting these conditions.

In this regard, it can be appreciated that implementation of the PRBS generators in software is preferred principally because hardware access may be denied at lower privilege levels which would thus require a software PRBS generator implementation. Further, software implementation of PRBS generators facilitates provision of identical PRBS generators and initialization thereof in both an application and its companion device driver or other higher privilege level software. It will also be appreciated that the invention can and should be used to protect the PRBS generators, themselves.

It is assumed for purposes of the following discussion that the application or other software is executing and performing functions which have not been secured in accordance with the invention, as indicated at dashed arrow 200. It is also assumed that PRBS generators 110, 120 have been initialized to the same seed value, the same mask and the same value of n and thus will output the same value and can be considered as being synchronized.

At some point in the list of program instructions prior to a section of the program which it is desired to secure, a sequence of operations A (and/or B and/or X) is interposed. These operations need. not be performed in immediate sequence but can have other operations interposed among them in order to render their purpose less recognizable to unauthorized personnel. For purposes of explanation of the invention, the sequence of instructions A is indicated as comprising three operations A1, A2 and A3. Each of these operations may include a plurality of commands.

When sequence A is reached in the program to secure one or more subsequent operations (e.g. A2) which are performed at a different privilege level or with specific hardware, step A1 increments the PRBS generator as shown at 202 and proceeds to protected step A2 which calls the desired function A ($Fn_A$) at privileged ring 0 (e.g. in the device driver) as shown at 204. Function A then increments PRBS generator 120. Function A then performs the desired operation and make a return to the application as shown at 208.

The application then proceeds to operation A3 and fetches the output of PRBS generator 110 as shown at 210 and calls $Fn_p$ to fetch the output of PRBS generator 120 as shown at 212 and return it to the application as shown at 214. Operation A3 then compares the outputs of PRBS generators 110 and 120 and, since they were both initially synchronized and both incremented once in the course of sequence A the comparison will be successful and the application continues as shown at 218.

Sequence B operates in a similar manner and need not be separately described. If the comparison of PRBS generator outputs is successful in operation B3 (corresponding to operation A3) the application continues as shown at 222.

If, however, operation A2 had not been authorized because, for example, the application had not been registered and access to ring 0 or any function therein (or operation to be performed thereby) was denied, the application could not proceed. If an unauthorized user were to attempt to defeat this denial of access by patching out step A1 (202), step A2 would increment PRBS generator 120 without PRBS generator 110 being incremented and the comparison at A3 (216) would fail.

Conversely, if an attempt to defeat the denial of access was made by patching out the incrementing of PRBS generator 120 during operation A, the comparison would also fail. Attempting to defeat the denial of access to subsequent sections of the application (e.g. for comparison of code) by patching out function A (e.g. by deleting or "NO-OPing operation A2) would also cause failure of the comparison since PRBS generator 110 would be incremented while PRBS generator 120 would not. Attempting to defeat the denial of access by patching in an increment or decrement to the PRBS generator 120 or 110 would also cause failure of the comparison at A3 since $Fn_A$ and other privileged functions, in accordance with the invention, increments PRBS generator 120 before performing the function.

Even if a privileged function is performed, a comparison is made before report of the result to the application. Upon failure of the comparison 216, the execution of the application may be terminated in any manner desired by the programmer, for example, by branching to any desired subroutine including deletion of the application or a more or less critical portion thereof from storage or even the storage medium by which it was loaded onto the computer.

A minimum of two patches must be simultaneously and correctly performed in order to defeat the denial of access to the privileged function and it is very unlikely that this could be successfully accomplished by an unauthorized user that does not have foreknowledge of the behavior of the application. It should be recalled that the observation of the behavior of the system is the very type of tampering which the invention is intended to prevent. Therefore, it can be understood that the invention, while simple and rapidly executable even if utilized or repeated many times in the application, is quite effective in providing protection against tampering which could expose the behavior of the application to an unauthorized person.

It is immaterial to the practice of the basic principles of the invention where the comparison is performed or if additional functions are performed in doing so that may also be privileged functions. However, some additional protection may be provided by performing such additional functions as will now be described in regard to secured operation X in FIG. 1 and FIG. 2B. In this case, operation X1 increments PRBS generator 110 as before in operation A1 as shown at 222. Operation X2 calls $Fn_x$ (224) and increments PRBS generator 120 (226) as before. A return is made to the application (228), again, in the manner described above.

Then operation X3 fetches (230) the PRBS value from PRBS generator 110 but now calls operation $Fn_p$, and provides the PRBS value (232) from PRBS generator 110 to the device driver. Privileged function $Fn_p$, then fetches the PRBS value from PRBS generator 120 and performs the comparison. $Fn_p$. either does not increment the PRBS generator 120 further or, alternatively, both X3 and $Fn_p$, could be arranged to further increment PRBS generators 110 and 120, respectively. This operation is similar to operation sequence A except that the comparison is performed at a higher (or at least different) privilege level. In practical effect, however, more locations are provided at which patches can be incorrectly applied by an unauthorized person and an inconsistency in convention is provided at either X3 or $Fn_p$, as compared to operation A3 and other privileged functions.

Figure 3:
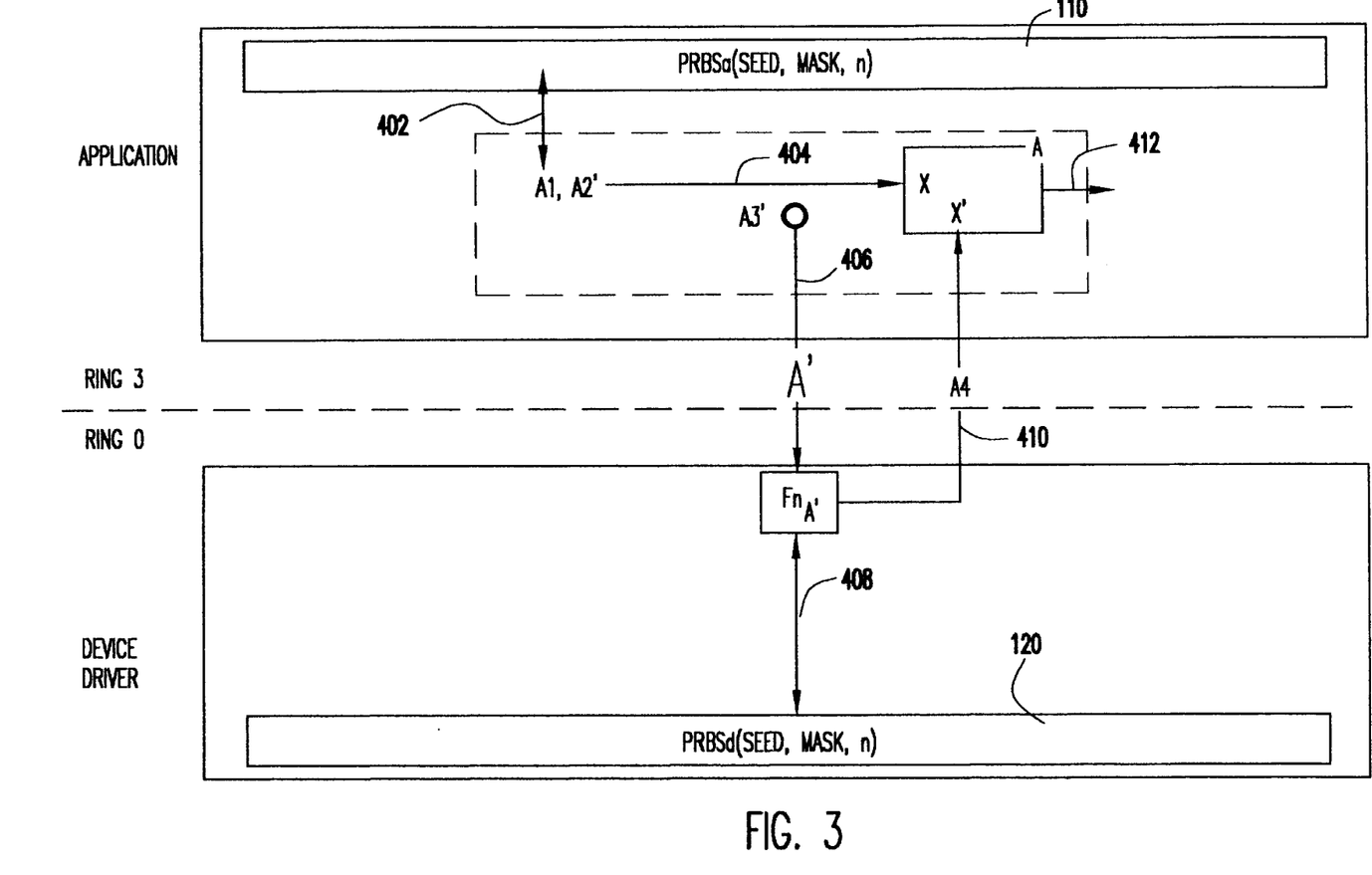
FIG. 3 is a high-level block diagram illustrating preferred enhancements to the embodiment of FIG. 1.
Figure 4:
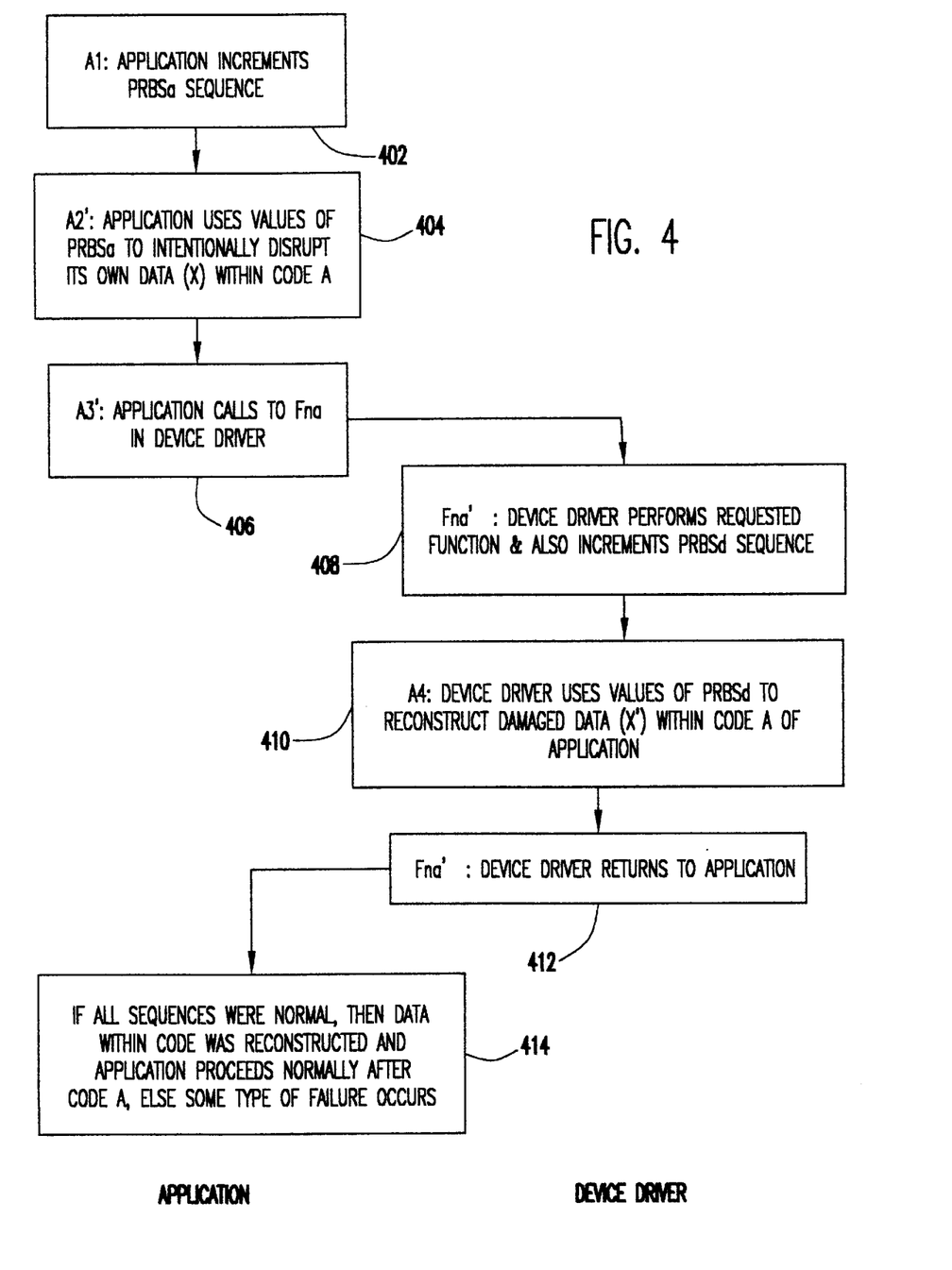
FIG. 4 is a flow chart illustrating the enhancement of the invention shown in FIG. 3.

Referring now to FIGS. 3 and 4, an enhancement of the invention will now be described. Whereas the embodiment of the invention described above can initiate termination of the application or destruction or corruption of files after the comparison of PRBS outputs fails, the enhancement of the invention illustrated in FIGS. 3 and 4 includes file corruption and repair as part of the tamper resistance and thus is both more robust in performance and causes protective action to be taken at an earlier time even before tampering is detected. This enhancement will be described as a variation A' of secured operation A described above.

Operation A1 is performed as before to increment PRBS generator 110. However, as indicated at 402, the incremented PRBS value is returned to the application. Operation A2' utilizes the PRBS value to intentionally disrupt or corrupt data and/or application program code using an algorithm X, as shown at 404 and the current PRBS value from PRBS generator 110. Operation A3' then calls privileged function $Fn_A$, to perform operation A' after incrementing PRBS generator 120 and returning the new PRBS value. The new PRBS value from PRBS generator 120, which should now be the same as that of PRBS generator 110, is then used to perform operation A4 using the PRBS value from PRBS generator 120 and algorithm X' which is the inverse of algorithm X to reconstruct the data or code corrupted at 404 as shown at 410.

In this case, no separate comparison need be made since incorrect reconstruction of the data or code will either halt the application or return an incorrect and meaningless result (since the data or code was corrupted by an effectively random binary code sequence). Further, no privileged operation other than the corruption and reconstruction of data need be performed in the course of operation A' and virtually no information can be obtained from the application by an unauthorized person attempting to observe program behavior. This enhancement may be used alone or in combination with privileged functions utilizing comparison as an alternative to particular instances of privileged functions such as A, B or X described above.

In view of the foregoing, it is seen that the invention, while simple and rapidly executed, provides a very high degree of tamper resistance in a single instance. Multiple instances of the invention can be provided and the tamper resistant procedure repeated, particularly with variations (e.g. FIG. 2B) and enhancements (e.g. FIG. 4) to provide a practically insurmountable degree of protection without compromising execution speed of the application.

While the invention has been described in terms of a single preferred embodiment, those skilled in the art will recognize that the invention can be practiced with modification within the spirit and scope of the appended claims.

What is claimed is:

1. A method for providing tamper resistance in software running on a processor having differentiated sections, said differentiated sections having respective pseudo-random binary sequence (PRBS) generators configured to incrementally provide the same pseudo-random binary sequence, one differentiated section being capable of performing a function not available on another differentiated section, said method comprising the steps of incrementing a first pseudo-random binary sequence generator associated with said another differentiated section, calling said function in said one differentiated section from said another differentiated section, incrementing a second pseudo-random binary sequence generator associated with said one differentiated section, comparing pseudo-random binary sequence values in said one and said another pseudo-random binary sequence generators, and execution of said software for performance of said function in accordance with a result of said comparing step.

2. A method as recited in claim 1, wherein said function is limited to incrementing a PRBS generator of said differentiated section.

3. A method as recited in claim 1, wherein a further function available in said one differentiated section calls for the pseudo-random binary sequence value from said another differentiated section and performs said comparison step in said one differentiated section.

4. A method as recited in claim 3, wherein said further function increments said pseudo-random binary sequence generator in said one differentiated section and said pseudo-random binary sequence generator in said another differentiated section is incremented when said further function is called.

5. A method as recited in claim 2, wherein a function available in said one differentiated section calls for the pseudo-random binary sequence value from said another differentiated section and performs said comparison step in said one differentiated section.

6. A method as recited in claim 5, wherein said further function increments said pseudo-random binary sequence generator in said one differentiated section and said pseudo-random binary sequence generator in said another differentiated section is incremented when said further function is called.

7. A method as recited in claim 1, including the further steps of altering data using an algorithm and a pseudo-random binary sequence value in said another differentiated section, and altering data using another algorithm having a function that is an inverse of said algorithm and a pseudo-random binary sequence value at said one differentiated section, whereby data altered by said algorithm is restored when the pseudo-random binary sequence values of said differentiated section and said another differentiated section are the same.

8. A method as recited in claim 1 wherein said differentiated sections are different privilege levels.

9. A method for providing tamper resistance in software running on a processor having differentiated sections, said differentiated sections having respective pseudo-random binary sequence generators configured to incrementally provide the same pseudo-random binary sequence, one differentiated section being capable of performing a function not available on another differentiated section, said method comprising the steps of altering data using an algorithm and a pseudo-random binary sequence value in said another differentiated section, and altering data using another algorithm having a function that is an inverse of said algorithm and a pseudo-random binary sequence value at said differentiated section, whereby data altered by said algorithm is restored when the pseudo-random binary sequence values of said differentiated section and said another differentiated section are the same, and whereby execution of said software is controlled upon detection of tampering.

10. A method as recited in claim 8 wherein said differentiated sections are different privilege levels.

11. A stored program for controlling a processor having differentiated sections, said differentiated sections having respective pseudo-random binary sequence generators configured to incrementally provide the same pseudo-random binary sequence, one differentiated section being capable of performing a function not available on another differentiated section, containing commands for causing said processor to perform the steps of incrementing a first pseudo-random binary sequence associated with said another differentiated section, calling said function in said one differentiated section from said another differentiated section, incrementing a second pseudo-random binary sequence generator associated with said one differentiated section, performing said function, comparing pseudo-random binary sequence values in said one and said another pseudo-random binary sequence generators, and controlling execution of said software in accordance with a result of said comparing step, whereby execution of said software may be controlled upon detection of tampering.

12. A program as recited in claim 11, wherein said function is limited to incrementing a PRBS generator of said one differentiated section.

13. A program as recited in claim 11, wherein a further function available in said one differentiated section calls for the pseudo-random binary sequence value from said another differentiated section and performs said comparison step in said one differentiated section.

14. A program as recited in claim 13, wherein said further function increments said pseudo-random binary sequence generator in said one differentiated section and said pseudo-random binary sequence generator in said another differentiated section is incremented when said further function is called.

15. A program as recited in claim 12, wherein a function available in said one differentiated section calls for the pseudo-random binary sequence value from said another differentiated section and performs said comparison step in said one differentiated section.

16. A program as recited in claim 15, wherein said further function increments said pseudo-random binary sequence generator in said one differentiated section and said pseudo-random binary sequence generator in said another differentiated section is incremented when said further function is called.

17. A program as recited in claim 11, including the further steps of altering data using an algorithm and a pseudo-random binary sequence value in said another differentiated section, and altering data using another algorithm having a function that is an inverse of said algorithm and a pseudo-random binary sequence value at said one differentiated section, whereby data altered by said algorithm is restored when the pseudo-random binary sequence values of said differentiated section and said another differentiated section are the same.

18. A stored program for controlling a processor having differentiated sections, said differentiated sections having respective pseudo-random binary sequence generators configured to incrementally provide the same pseudo-random binary sequence, one differentiated section being capable of performing a function not available on another differentiated section, said stored program containing commands for causing said processor to perform the steps of altering data using an algorithm and a pseudo-random binary sequence value in said another differentiated section, and altering data using another algorithm having a function that is an inverse of said algorithm and a pseudo-random binary sequence value at said differentiated section, whereby data altered by said algorithm is restored when the pseudo-random binary sequence values of said differentiated section and said another differentiated section are the same, and whereby execution of said software is controlled upon detection of tampering.

\* \* \* \* \*